United States Patent [19]

Kosugi et al.

[11] Patent Number: 5,379,073
[45] Date of Patent: Jan. 3, 1995

[54] STILL IMAGE SIGNAL PROCESSING DEVICE

[75] Inventors: Masato Kosugi, Tokyo; Yuji Sakaegi, Kanagawa, both of Japan

[73] Assignee: Canon Kabushiki Kaisha, Tokyo, Japan

[21] Appl. No.: 934,788

[22] Filed: Aug. 24, 1992

[30] Foreign Application Priority Data

Aug. 27, 1991 [JP] Japan .................................. 3-240481

[51] Int. Cl.$^6$ ............................................ H04N 5/907
[52] U.S. Cl. ..................................... 348/513; 348/714; 345/203; 360/35.1
[58] Field of Search ...................... 358/21 R, 160, 149, 358/408; 360/14.1, 35.1; H04N 5/907; 340/799; 348/526, 513, 714, 718; 345/200, 203

[56] References Cited

U.S. PATENT DOCUMENTS

| | | | |
|---|---|---|---|
| 4,665,437 | 5/1987 | Nicholson | 358/160 |
| 4,713,693 | 12/1987 | Southworth et al. | 358/160 |
| 4,816,929 | 3/1989 | Bradley et al. | 360/35.1 |
| 4,956,708 | 9/1990 | Itagaki | 358/160 |
| 5,136,435 | 8/1992 | Miyahara et al. | 360/14.1 |
| 5,241,281 | 8/1993 | Wilkes et al. | 345/203 |
| 5,249,065 | 9/1993 | Juso et al. | 360/35.1 |

FOREIGN PATENT DOCUMENTS 3188778  8/1991  Japan .......................... H04N 5/907

Primary Examiner—Victor R. Kostak
Assistant Examiner—Jeffrey S. Murrell

[57] ABSTRACT

An image signal processing device is arranged to receive an input image signal including horizontal and vertical synchronizing signals; to make a discrimination on the basis of the horizontal and vertical synchronizing signals, as to whether a period of the input image signal is less than a predetermined period or not; then, in accordance with information on the result of the discrimination, to cause a memory to store only a part of the input image signal corresponding to the predetermined period if the period of the input image signal is not less than the predetermined period; and if the period of the input image signal is less than the predetermined period, to cause the memory to complement the input image signal with a predetermined signal for a period by which the period of the input image signal is less than the predetermined period and store the complemented image signal. This arrangement enables the device to give a stable still image without any turbulence at the time of reproduction, irrespective of whether the input image signal is a noninterlaced image signal or an interlaced image signal and whether the recording and reproducing method is a field recording and reproducing method of a frame recording and reproducing method.

18 Claims, 3 Drawing Sheets

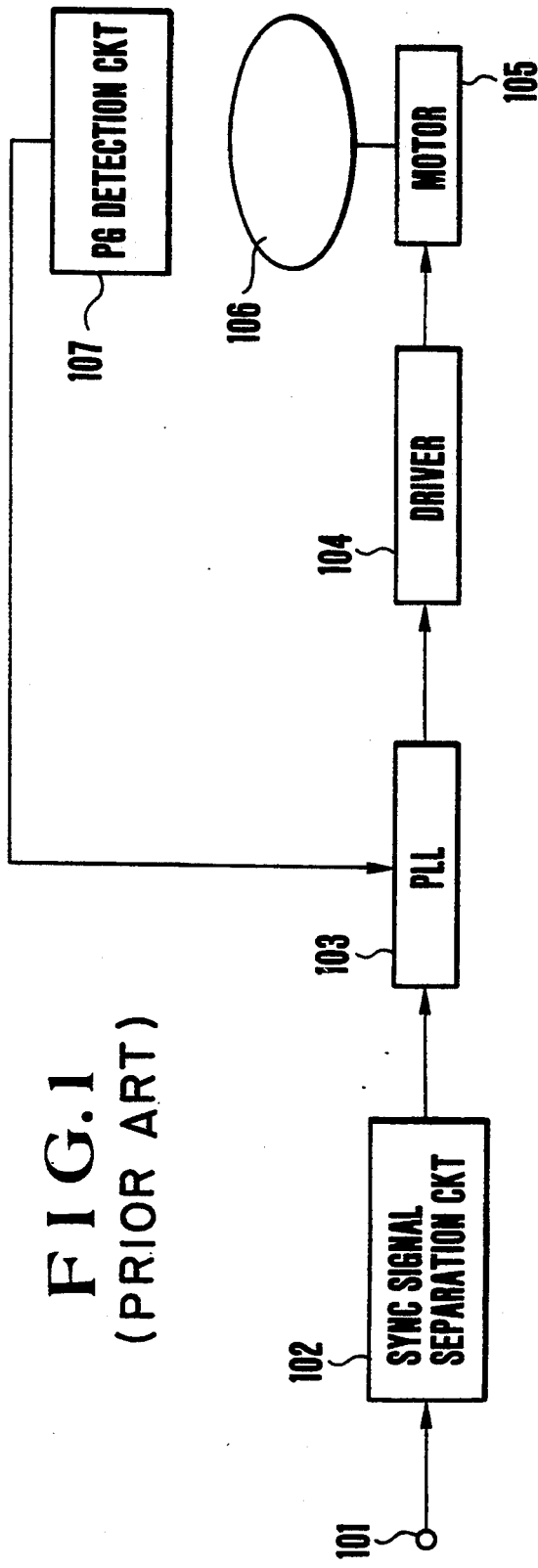
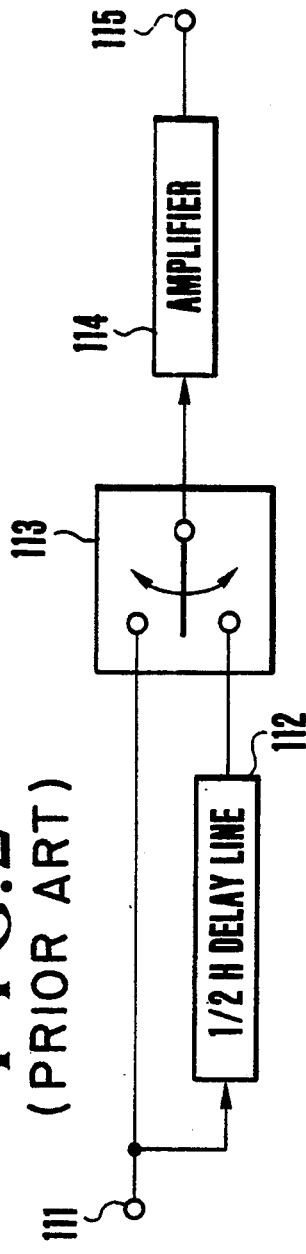
FIG. 1 (PRIOR ART)
FIG. 2 (PRIOR ART)

STILL IMAGE SIGNAL PROCESSING DEVICE

BACKGROUND OF THE INVENTION

1. Field the Invention

This invention relates to a still image signal processing device for recording a still image signal on a recording medium such as a floppy disc and for reproducing the still image signal recorded on the recording medium.

2. Description of the Related Art

In the conventional still image signal recording or reproducing apparatus of the kind using a video floppy disc (hereinafter referred to as a VF disc) as a recording medium, a motor control circuit has been arranged as shown in FIG. 1 of the accompanying drawings. Referring to FIG. 1, a video signal to be recorded or reproduced is inputted to an input terminal 101. At a synchronizing (hereinafter abbreviated to sync) signal separation circuit 102, a vertical sync signal (hereinafter referred to as a sync signal VD) is separated from the video signal. The sync signal VD is inputted to a phase-locked loop (hereinafter referred to as a PLL) 103. Meanwhile, a PG pin which is disposed at a VF disc 106 is detected by a PG detection circuit 107. The PG detection circuit 107 then supplies to the PLL 103 a pulse signal which is synchronized with the rotation of the VF disc 106. The PLL 103 outputs a signal reflecting a phase difference between the pulse signal and the sync signal VD.

The output signal of the PLL 103 is supplied to a driver 104. The driver 104 is arranged to output a driving signal under the control of the signal from the PLL 103 for causing a motor 105 to rotate the VF disc 106.

The rotation of the VF disc 106 is thus controlled to be in synchronism with the sync signal VD. When recording an ordinary interlaced video signal on the VF disc 106, one turn of the VF disc 106 takes a period of time 262.5 times as much as the horizontal synchronizing period (hereinafter referred to as "H") (in the NTSC system). In other words, according to this still image signal reproducing system (hereinafter referred to as "SV format"), a video signal of 262.5 H is recorded in each track which is arranged on the VF disc 106 to record the video signal for one field.

Two methods are used for recording a video signal on the VF disc 106, including a field recording method in which an amount of the video signal for one field is recorded in one track on the VF disc 106, and a frame recording method in which an amount of the video signal for one frame is recorded in two tracks, that is, in a recording area corresponding to two fields.

As for a method for reproducing the video signal thus recorded on the VF disc 106, there are two methods including a field reproducing method in which an image is reproduced from the video signal recorded in one track (a recording area for one field) on the VF disc 106, and a frame reproducing method in which an image is reproduced from the video signal recorded in two tracks (a recording area for two fields).

In order to reproduce by the field reproducing method the video signal recorded by the field recording method and to have the reproduced signal displayed as an image on a cathode-ray tube (hereinafter referred to as a CRT), the video signal must be converted into an interlaced video signal. Therefore, a circuit which is arranged as shown in FIG. 2 is included as a component element in a signal processing circuit which is arranged to perform various processes on the video signal reproduced from the VF disc 106. The video signal inputted from an input terminal 111 is outputted from an output terminal 115 through an amplifier 114 after the video signal is switched by every one field by a switch 113. More specifically, a video signal forming an odd-number field is allowed to be outputted without passing through a ½ H delay line 112, while another video signal forming an even-number field is outputted after being delayed by the ½ H delay line 112. The input video signal is thus converted into an interlaced video signal. This process is called a ½ H skew compensation.

If a noninterlaced video signal is to be recorded while controlling the motor 105 by means of the motor control circuit which is arranged as shown in FIG. 1, the recording track comes to deviate from the SV format, for the following reason: in that case, one field of the noninterlaced video signal is composed of a video signal of 262 H or 263 H. This video signal is inputted to the input terminal 101 of the control circuit of FIG. 1. The rotation of the VF disc 106 is then controlled to record the video signal of 262 H or 263 H, instead of 262.5 H, in one track on the VF disc 106. The recording track thus deviates from the SV format.

The problem can be solved by recording a 2-track amount of the noninterlaced video signal according to the frame recording method and by reproducing the same according to the frame reproducing method. In that case, the recorded signal can be correctly reproduced as the noninterlaced video signal, because the intervals of a horizontal sync signal (hereinafter referred to as a sync signal HD) are adequately maintained. However, in cases where the noninterlaced video signal which has been recorded by the field recording method is reproduced by the field reproducing method, the intervals of the sync signal HD come to vary every time one field is switched over to another because of the ½ H skew compensation made at the time of reproduction. This results in a turbulence of the reproduced image on the CRT.

SUMMARY OF THE INVENTION

It is a general object of this invention to provide an image signal processing device which is capable of solving the above-stated problem of the prior art.

It is a more specific object of this invention to provide an image signal processing device which is capable of always stably reproducing a still image without any turbulence at the time of reproduction irrespective of whether an image signal to be processed is a noninterlaced image signal or an interlaced image signal and whether the reproducing method employed is the field reproducing method or the frame reproducing method.

Under this object, an image signal processing device arranged to process image signals in accordance with this invention comprises memory means for storing an image signal; discrimination means arranged to receive an input image signal including horizontal and vertical synchronizing signals, to make a discrimination, by using the horizontal and vertical synchronizing signals included in the input image signal, as to whether a period of the input image signal is less than a predetermined period or not and to output a discrimination information signal indicative of a result of the discrimination; and memory control means arranged operatively in accordance with the discrimination information signal outputted from the discrimination means, to cause the memory means to store only a part of the input image signal corresponding to the predetermined period if the period of the input image signal is not less than the predetermined period, and if the period of the input image signal is less than the predetermined period, to cause the memory means to complement the input image signal with a predetermined signal for a period by which the period of the input image signal is less than the predetermined period and store the complemented image signal.

It is another object of the invention to provide an image signal processing device which is capable of recording an image signal in such a manner that a still image can be stably reproduced without any turbulence, irrespective of whether the image signal is a noninterlaced image signal or an interlaced image signal and whether the recording method employed is the field recording method or the frame recording method.

Under that object, an image signal processing device arranged to record image signals according to the invention comprises memory means for storing an image signal; discrimination means arranged to receive an input image signal including horizontal and vertical synchronizing signals, to make a discrimination, by using the horizontal and vertical synchronizing signals included in the input image signal, as to whether a period of the input image signal is less than a predetermined period or not and to output a discrimination information signal indicative of a result of the discrimination; recording method selection means arranged to select a recording method from among a field recording method for recording an image signal for one filed in an image signal recording area for one field on a recording medium and a frame recording method for recording an image signal for one frame in an image signal recording area for two fields on the recording medium and to output a selection information signal indicative of the selected recording method; recording means for recording on the recording medium an output image signal outputted from the memory means; and control means for controlling a storing action of the memory means on the input image signal and a recording action of the recording means on the output image signal in accordance with the discrimination information signal outputted from the discrimination means and the selection information signal outputted from the recording method selection means.

The above and other objects and features of the invention will become apparent from the following detailed description of embodiments thereof taken in connection with the accompanying drawings.

BRIEF DESCRIPTION OF THE DRAWINGS

FIG. 1 is a block diagram showing by way of example the arrangement of the motor driving and control system of the conventional image signal processing device.

FIG. 2 is a block diagram showing by way of example the arrangement of the skew compensation system of the conventional image signal processing device.

DETAILED DESCRIPTION OF THE PREFERRED EMBODIMENTS

Figure 3:
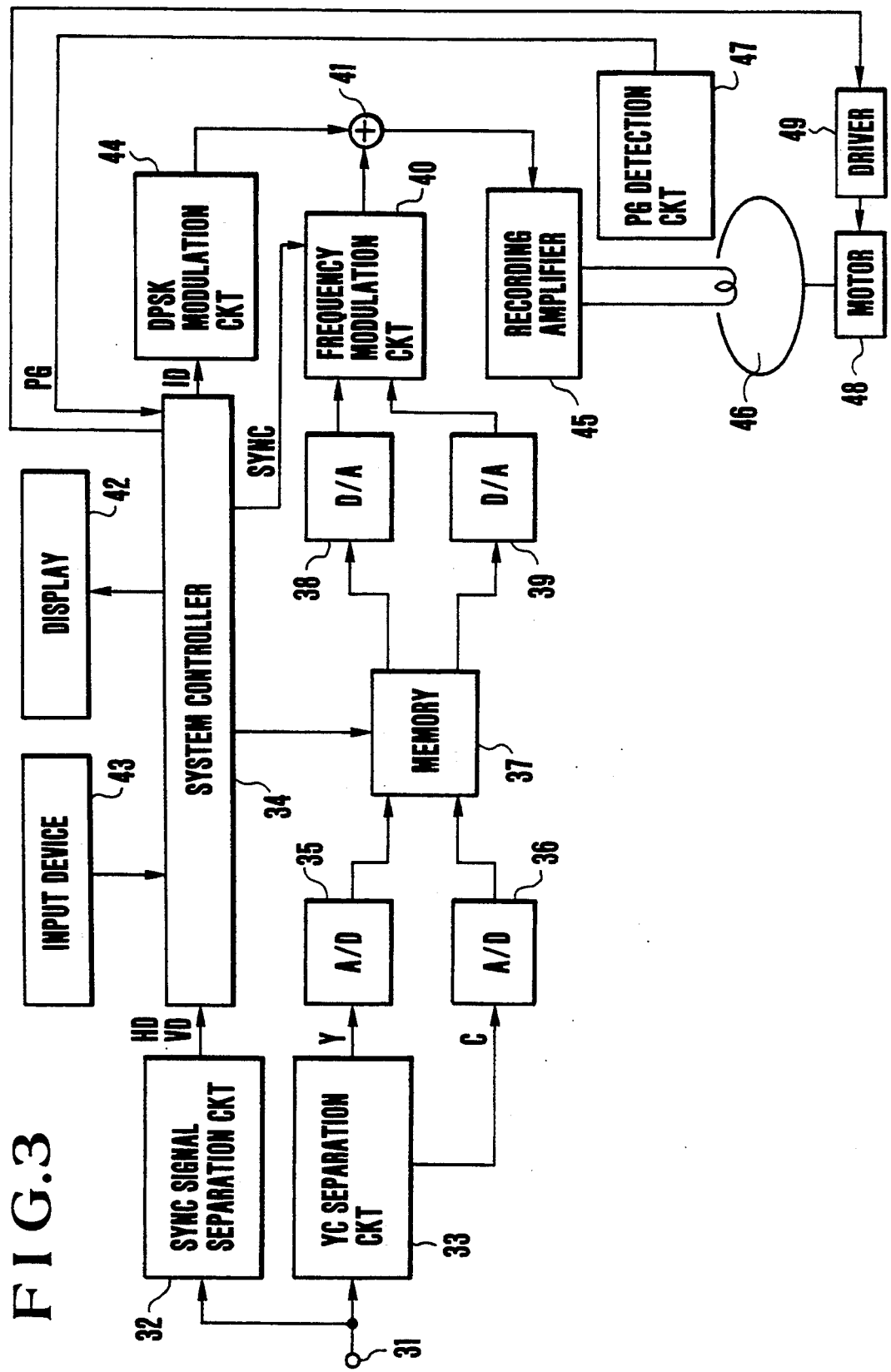
FIG. 3 is a block diagram showing in outline the arrangement of a still image recording apparatus which is arranged as an embodiment of this invention.

The following describes embodiments of this invention with reference to the accompanying drawings:

FIG. 3 shows in a block diagram the arrangement of a still image recording apparatus which is arranged as an embodiment of the invention. Referring to FIG. 3, a TV video signal is inputted to an input terminal 31. The input terminal 31 is connected to the input side of a sync signal separation circuit 32 which is arranged to extract, from the input video signal, only the sync signals HD and VD and to output the sync signals HD and VD. The input terminal 31 is connected also to the input side of a YC separation circuit 33 which is arranged to extract, from the input video signal, a luminance signal Y and a chrominance signal C and to output the signals Y and C.

The output side of the sync signal separation circuit 32 is connected to the input side of a system controller 34 which is composed of a microcomputer. The signals Y and C separated by the YC separation circuit 33 are respectively inputted to the input terminals of A/D (analog-to-digital) converters 35 and 36. The output terminals of the A/D converters 35 and 36 are connected to the input terminals of a memory 37. Digital video signals outputted from the A/D converters 35 and 36 are written in and read out from the memory 37 under the control of control signals coming from the system controller 34.

The output side of the memory 37 is connected to the input sides of D/A (digital-to-analog) converters 38 and 39 respectively for the signals Y and C. The output sides of the D/A converters 38 and 39 are respectively connected to the input side of a frequency modulation circuit 40. The system controller 34 is arranged to supply the sync signals HD and VD to the frequency modulation circuit 40. The frequency modulation circuit 40 is arranged to form a video signal from the signals Y and C and the sync signals HD and VD, to frequency-modulate the video signal and to supply the frequency-modulated video signal to an adder 41.

The system controller 34 supplies an ID signal to a differential phase-shift keying (abbreviated to DPSK) modulation circuit 44. The output side of the DPSK modulation circuit 44 is connected to the input side of the adder 41. At the adder 41, the ID signal which is DPSK-modulated is added to the video signal outputted from the frequency modulation circuit 40. The output side of the adder 41 is connected to a recording amplifier 45. The recording amplifier 45 is arranged to record the video signal and the ID signal on a VF disc 46.

A PG pin disposed at the VF disc 46 is detected by a PG detection circuit 47 and the result of detection is inputted to the system controller 34 as a PG signal. The output side of the system controller 34 is connected to the input side of a driver 49 which is arranged to supply a driving signal to a motor 48 for causing the VF disc 46 to rotate. An input device 43 is provided with a switch for selection of either the field recording method or the frame recording method.

This embodiment operates as described below:

The operation to be performed when the field recording method is selected by the input device 43 is first described as follows: the video signal inputted to the input terminal 31 is supplied to the sync signal separation circuit 32 and the YC separation circuit 33. At the sync signal separation circuit 32, the sync signals HD and VD are separated from the input video signal and are supplied to the system controller 34. The YC separation circuit 33 separates the signals Y and C from the input video signal and supplies the signals Y and C respectively to the A/D converters 35 and 36. The A/D converters 35 and 36 then convert the signals Y and C into digital signals, which are stored in predetermined storage areas within the memory 37.

The system controller 34 controls a write enable timing for data writing into the memory 37 on the basis of the sync signals HD and VD separated by the sync signal separation circuit 32. In order to make efficient use of the capacity of the memory 37, the system controller 34 disables the writing into the memory 37 during horizontal and vertical blanking periods, and only the video signal is taken into the memory 37. Then, color-difference signals R-Y and B-Y are alternately stored for every H period in conformity to the SV format. The system controller 34 counts the H periods in units of ½ H so as to find how many H periods are included in one vertical sync period (hereinafter referred to as V) of the video signal.

Further, the system controller 34 makes a discrimination as to whether the video signal is an interlaced video signal or a noninterlaced video signal, on the basis of the sync signals HD and VD separated from the video signal by the sync signal separation circuit 32. In other words, the system controller 34 determines whether the current input video signal is of an odd-number field or an even-number field, by detecting the timing of the two sync signals HD and VD. If the odd-number field consecutively recurs or the even-number field consecutively recurs, the video signal is considered to be a noninterlaced video signal. If the odd-number and even-number fields alternately recur, the video signal is considered to be an interlaced video signal.

In a case where the input video signal is an interlaced video signal, the video signal for 262.5 H (periods) is written into the memory 37. If the input video signal is a noninterlaced video signal and is in a state of "1 V≧263 H", a part of the video signal for 262.5 H is written into the memory 37 and a part of the video signal beyond the 262.5 H is not written into the memory 37. If the video signal is in a state of "1 V≧262 H", the video signal is complemented with a black-level signal for a period by which the period of the video signal is shorter than 262.5 H so as to be made into a video signal for 262.5 H, and the complemented video signal is temporarily stored in the memory 37.

The video signal which is temporarily stored in the above-stated manner is read out from the memory 37 under the control of the system controller 34. The timing of the reading control is independent of that of the writing control. The system controller 34 first forms original sync signals HD and VD. These sync signals HD and VD are in the relation of "1 V=262.5 H" (in the NTSC system). The motor 48 which is arranged to rotate the VF disc 46 is controlled by the driver 49 to rotate constantly at the same frequency as the sync signal VD. Meanwhile, the PG signal from the PG detection circuit 47 is supplied to the system controller 34. The system controller 34 then controls the timing of the reading action on the memory 37 on the basis of the PG signal, which is a pulse signal. More specifically, the system controller 34 determines the phases of the sync signals HD and VD and controls the read enable timing for reading from the memory 37. The luminance and chrominance signals Y and C read out from the memory 37 is D/A converted by the D/A converters 38 and 39. To the signal Y is added a sync signal which is based on the sync signals HD and VD formed by the system controller 34. The signals Y and C are then subjected to preemphasis and frequency modulation processes at the frequency modulation circuit 40. After these processes, the video signal thus outputted from the frequency modulation circuit. 40 is supplied to the adder 41 to be mixed with the ID signal which has been DPSK-modulated by the DPSK modulation circuit 44. The output of the adder 41 is amplified by the recording amplifier 45, and is recorded on the VF disc 46 by a recording head. Through the above-stated processes, a video signal for 262.5 H is recorded in one track on the VF disc 46 irrespective of whether the video signal is an interlaced video signal or a noninterlaced video signal.

Next, in a case where the frame recording method is selected by the input device 43, the operation of the embodiment is performed as follows: when the video signal inputted through the input terminal 31 is a noninterlaced video signal, if the operator attempts to record this signal by the frame recording method, in this embodiment, a display device 42 displays a warning to urge the operator to change the selection of the recording method to the field recording method. Further, this arrangement may be changed to forcibly carry out the field recording method. The reason for changing the recording method is as follows: in the case of a noninterlaced video signal, the scanning lines appear in exactly the same positions on the image plane both for first and second fields. Therefore, the selection of the frame recording method gives only the same amount of information as in the case of the field recording method. If the operator still selects the frame recording method, despite of the warning, the operation is performed in accordance with the following procedures:

In the first field, if the input video signal is in the state of "1 V≧263 H", a part of the video signal beyond 262.5 H is not written into the memory 37. Only a part of the video signal for 262.5 H is written into the memory 37. If the input video signal is in the state of "1V≦262 H", the video signal is complemented with a black-level signal for a period by which the period of the video signal is shorter than 262.5 H so as to be made into a video signal for 262.5 H, and the complemented video signal is written into the memory 37. In the second field, the black-level signal for ½ H is first inserted and, after that, the video signal is written into the memory up to the amount of 262.5 H. If the addition of the black-level signal for ½ H and the video signal fails to reach 262.5 H, the video signal is written into the memory 37 as a video signal for 262.5 H by adding a black-level signal to a deficient portion of the video signal. Other actions such as the reading-out from the memory 37 are carried out in the same manner as in the case of the field recording method, so that the noninterlaced video signal can be recorded in conformity with the SV format by the frame recording method. The video signal thus recorded on the VF disc 46 is no longer the noninterlaced video signal. However, these procedures bring about no problem at the time of reproduction.

The above-stated procedures, or a first signal processing method, for recording a noninterlaced video signal by the frame recording method may be replaced with a second signal processing method which is carried out as follows: the procedures of the second signal processing method are the same as the above-stated procedures of the first signal processing method up to the step of writing the video signal of the first field into the memory 37. However, in the case of the second signal processing method, no video signal is newly taken in for writing the video signal of the second field into the memory 37. Instead, the video signal of the second field is obtained by an arithmetic operation, through interline interpolation, from the video signal of the first field written in the memory 37. The video signal obtained in this manner is recorded on the VF disc 46 in the same manner as the recording action described in the foregoing. The arithmetic operation and the memory control are all performed by the system controller 34. While the video signal flickers at the time of reproduction by the frame reproduction method according to the first signal processing method described in the foregoing, the second signal processing method eliminates such flickers in reproducing the signal by the frame reproduction method as the signal is recorded in a state of completely interlaced video signal.

In recording an interlaced video signal by the frame recording method, the sync signals are separated from the interlaced video signal inputted to the input terminal 31. After that, the interlaced video signal is written into the memory 37 as it is. The video signal is then recorded on the VF disc 46 by reading it out from the memory 37 in synchronism with the timing of recording on the VF disc 46.

While the embodiment has been described with respect to the video signal of the NTSC system, the video signal of the PAL system or the SECAM system can be processed in the same manner.

Figure 4:
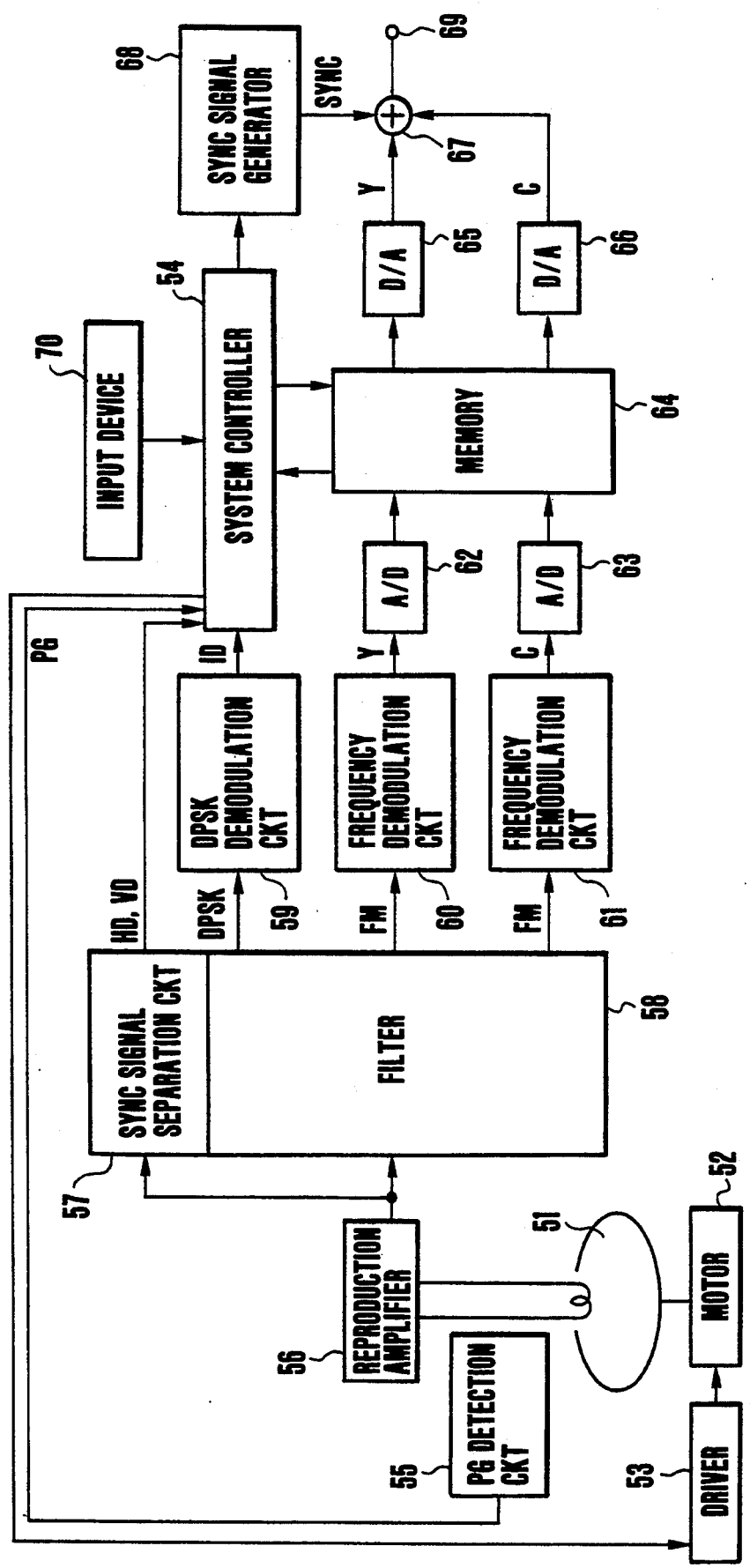
FIG. 4 is a block diagram showing in outline the arrangement of a still image reproducing apparatus which is arranged as an embodiment of this invention.

FIG. 4 shows in a block diagram the arrangement of a still image reproducing apparatus which is arranged as an embodiment of this invention. Referring to FIG. 40 A VF disc 51 is driven to rotate by a motor 52. The motor 52 is driven by a driving signal coming from a driver 53. The input side of the driver 53 is connected to the output side of a system controller 54. The system controller 54 is thus arranged to supply a control signal to the driver 53 for control over the motor 52. A PG detection circuit 55 is arranged above the VF disc 51 to detect a PG signal and to supply the PG signal to the system controller 54. A reproduction amplifier 56 which is provided with a magnetic head is arranged above the VF disc 51 to pick up a video signal recorded on the VF disc 51, to amplify the video signal and to supply the amplified video signal to a sync signal separation circuit 57 and a filter 58. The sync signal separation circuit 57 is arranged to extract horizontal and vertical sync signals HD and VD from the input video signal and to output these sync signals. The filter 58 is provided with band-pass filters for bandwidths which correspond to the frequency bands of a luminance signal Y, a chrominance signal C and an ID signal. The filter 58 is thus arranged to filter and extract from the input video signal the ID signal which has been DPSK-modulated and the signals Y and C which has been frequency-modulated.

The ID-signal output terminal of the filter 58 is connected to the input terminal of a DPSK demodulation circuit 59. The Y-signal output terminal of the filter 58 is connected to the input terminal of a frequency demodulation circuit 60 for the signal Y. The C-signal output terminal of the filter 58 is connected to the input terminal of a frequency demodulation circuit 61 for the signal C. The output side of the sync signal separation circuit 57 and that of the DPSK demodulation circuit 59 are connected to the input side of the system controller 54. The output sides of the frequency demodulation circuits 60 and 61 are respectively connected to the input sides of A/D converters 62 and 63. The output sides of the A/D converters 62 and 63 are connected to the input side of a memory 64 which is employed as storage means. The data writing and reading actions on the memory 64 are controlled by control signals from the system controller 54. The output side of the memory 64 is connected respectively to the input side of the D/A converter 65 for the signal Y and that of the D/A converter for the signal C. The output sides of the D/A converters 65 and 66 are connected respectively to the input side of an adder 67.

The input side of a sync signal generator 68 is connected to the output side of the system controller 54. The sync signal generator 68 is thus arranged to generate a composite sync signal on the basis of a control signal inputted from the system controller 54. The composite sync signal thus generated is supplied to an adder 67. The adder 67 is arranged to output a TV signal of the NTSC system or the like. To the output side of the adder 67 is connected to an output terminal 69 and is thus arranged to supply the TV signal to the input terminal of a display device such as a CRT connected to the output terminal 69.

An input device 70 which is a keyboard or the like is connected to the input side of the system controller 54 and is arranged to select either the field reproducing method or the frame reproducing method.

The motor 52, the driver 53, the PG detection circuit 55 and the reproduction amplifier 56 are arranged to detect a video signal recorded on the VF disc 51 and to reproduce the video signal as an electrical signal.

The following describes the operation of the embodiment which is arranged in the above-stated manner:

The operation to be performed when the field reproducing method is selected by the input device 70 is first described as follows: the motor 52 which rotates the VF disc 51 is controlled by the driver 53 to rotate at a given rotational frequency. The video signal recorded on the VF disc 51 which is read out by the magnetic head of the reproduction amplifier 56 is amplified by the reproduction amplifier 56. The amplified video signal is separated into an ID signal, a luminance signal Y and a chrominance signal C by the filter 58. At the same time, sync signals HD and VD are separated from the video signal by the sync signal separation circuit 57. These sync signals DH and VD are supplied to the system controller 54. The ID signal which is separated by the filter 58 is DPSK-demodulated by the DPSK demodulation circuit 59. The signals Y and C are frequency-demodulated by the frequency demodulation circuits 60 and 61. The demodulated ID signal is supplied to the system controller 54. The demodulated signals Y and C are converted into digital signals respectively by the A/D converters 62 and 63 and are then temporarily stored in the memory 64. The timing for writing into the memory 64 is controlled by the system controller 54. More specifically, the system controller 54 operates on the basis of the sync signals HD and VD separated by the sync signal separation circuit 57 to take only the video signal into the memory 64 and to disable the writing during horizontal and vertical blanking periods.

The system controller 54 exchanges data with the memory 64 and performs arithmetic operations for various purposes including, for example, interline interpolation, dropout compensation, a process of making color-difference signals simultaneous, etc. The results of the arithmetic operations can be again written into the memory 64. The sync signals HD and VD are arranged to be countable by the system controller 54 and the process of writing into the memory 64 can be controlled at every period of 1 H or ½ H. The writing into the memory 64 is terminated at the end of 262.5 H and not performed any further. If the amount of a video signal included in the reproduced video signal outputted from the reproduction amplifier 56 is less than 262.5 H and, for example, is only 262 H, black-level data is added to the reproduced video signal up to the amount of 262.5 H after the end thereof. The system controller 54 in the meantime forms original horizontal and vertical sync signals HD and VD at a rate of 1 V=262.5 H and controls the reading from the memory 64 at independent timing on the basis of the sync signals HD and VD. Further, the system controller 54 causes the sync signal generator 68 to generate a sync signal at the reading timing. The sync signal thus generated by the sync signal generator 68 is mixed at the adder 67 with the signals Y and C which have been made into analog signals by the D/A converters 65 and 66. A composite signal thus formed by the adder 67 is outputted from the output terminal 69. Further, the ½ H skew compensation is accomplished by controlling the data reading from the memory 64. The process of the ½ H skew compensation may be replaced with an interpolation process which is carried out by obtaining the data of the second field from the data of the first field by line averaging.

The above-stated arrangement enables the embodiment to adequately reproduce, as an interlaced video signal without any image turbulence, a noninterlaced video signal which is recorded on the VF disc 51 in a state not conforming to the SV format. Further, while the embodiment is arranged to operate on the basis of 1 V=262.5 H, the arrangement may be changed to reproduce a noninterlaced video signal on the basis of 1 V=262 H or 263 H instead of 262.5 H.

Next, in a case where the frame reproducing method is selected by operating the input device 70, the embodiment operates as follows: an interlaced video signal is reproduced in exactly the same manner as the field reproducing method described above. However, in a case where a noninterlaced video signal is recorded in a pair of tracks on the VF disc 51, the operation by the frame reproducing method is performed in accordance with the following procedures:

The system controller 54 first determines from the sync signals HD and VD that the reproduced signal is a noninterlaced video signal. More specifically, the system controller 54 checks the timing of both the sync signals HD and VD of the reproduced signal for finding whether the reproduced signal is of an odd field or an even field. The reproduced signal is determined to be a noninterlaced signal if either the odd number field or the even number field consecutively recurs and to be an interlaced signal if the odd number field and the even number field recur alternately. In the event of a noninterlaced video signal, the system controller 54 stores the signal in the memory 64 and reproduces it in the same manner as it is recorded. The recorded signal thus can be reproduced as the noninterlaced video signal. For example, if the reproduced signal is in the state of 1 V=262 H, the system controller 54 forms sync signals HD and VD in the state of 1 V=262 H and controls the reading from the memory 64 on the basis of these sync signals HD and VD for reproducing the recorded signal as the noninterlaced signal. Further, the first-field signal data is stored in the same manner as the field reproducing method described above up to the point of 1 V=262.5 H. As for the second field, a video signal data may be created by line averaging the first field and stored by interpolating it. Reading from the memory 64 is performed in the same manner as in the case of the field reproducing method.

Although the noninterlaced signal is converted into an interlaced signal before reproduction according to the above-stated method of this embodiment, the method brings about no problem in the actual operation of the embodiment. While the embodiment is described with respect to the signals conforming to the NTSC system, the signals conforming to the PAL system can be processed in the same manner.

In the still image recording apparatus and the still image reproducing apparatus which has been described as embodiments of this invention, a memory is arranged to temporarily store a video signal; a video signal or a processed video signal formed by processing the video signal or a black level signal is written into the memory at least for a given number of horizontal synchronizing periods; and the signal thus stored is read out from the memory and recorded on a recording medium. Therefore, at the time of reproduction, a stable still image can be reproduced without any turbulence irrespective of whether the kind of the video signal is a noninterlaced video signal or an interlaced video signal and whether the signal is recorded and reproduced by the field recording and reproducing methods or by the frame recording and reproducing methods.

What is claimed is:

1. An image signal processing device for processing image signals, comprising:
    a) memory means for storing an image signal;
    b) means arranged to receive an input image signal including horizontal and vertical synchronizing signals, to make a discrimination, by using the horizontal and vertical synchronizing signals included in the input image signal, as to whether a period of the input image signal is less than a predetermined period or not and to output a discrimination information signal indicative of a result of the discrimination; and
    c) memory control means arranged operatively in accordance with the discrimination information signal outputted from said discrimination means, to cause said memory means to store only a part of the input image signal corresponding to said predetermined period if the period of the input image signal is not less than said predetermined period, and if the period of the input image signal is less than said predetermined period, to cause said memory means to complement the input image signal with a predetermined signal for a period by which the period of the input image signal is less than said predetermined period and store the complemented image signal.

2. A device according to claim 1, wherein said predetermined signal includes an image signal indicative of a black level.

3. A device according to claim 1, wherein said predetermined period is 262.5 H (H: 1 horizontal synchronizing period).

4. An image signal processing device for processing image signals, comprising:
    a) memory means for storing an image signal;

b) discrimination means arranged to receive an input image signal, to make a discrimination as to whether the input image signal is an interlaced image signal or a noninterlaced image signal and to output a discrimination information signal indicative of a result of the discrimination; and c) memory control means arranged operatively in accordance with the discrimination information signal outputted from said discrimination means, to cause, in a case where the input image signal is the noninterlaced image signal, said memory means to store only a part of the input image signal corresponding to a predetermined period if a period of the input image signal is not less than said predetermined period, and if the period of the input image signal is less than said predetermined period, to complement the input image signal with a predetermined signal for a period by which the period of the input image signal is less than said predetermined period and store the complemented image signal.

5. A device according to claim 4, wherein said predetermined signal includes an image signal indicative of a black level.

6. A device according to claim 4, wherein said predetermined period is 262.5 H (H: 1 horizontal synchronizing period).

7. An image signal processing device for processing image signals, comprising:

a) memory means for storing an image signal;

b) discrimination means arranged to receive an input image signal including horizontal and vertical synchronizing signals, to make a discrimination, by using the horizontal and vertical synchronizing signals included in the input image signal, as to whether a period of the input image signal is less than a predetermined period or not and to output a discrimination information signal indicative of a result of the discrimination;

c) recording method selection means arranged to select a recording method from among a field recording method for recording an image signal for one field in an image signal recording area for one field on a recording medium and a frame recording method for recording an image signal for one frame in an image signal recording area for two fields on the recording medium and to output a selection information signal indicative of the selected recording method;

d) recording means for recording on the recording medium an output image signal outputted from said memory means; and e) control means for controlling a storing action of said memory means on the input image signal and a recording action of said recording means on the output image signal in accordance with the discrimination information signal outputted from said discrimination means and the selection information signal outputted from said recording method selection means.

8. A device according to claim 7, wherein said control means is arranged operatively in accordance with the discrimination information signal outputted from said discrimination means, to cause said memory means to store only a part of the input image signal corresponding to said predetermined period if the period of the input image signal is not less than said predetermined period, and if the period of the input image signal is less than said predetermined period, to cause said memory means to complement the input image signal with a predetermined signal for a period by which the period of the input image signal is less than said predetermined period and store the complemented image signal.

9. A device according to claim 7, wherein said control means is arranged to control said recording means in accordance with the discrimination information signal outputted from said discrimination means and the selection information signal outputted from said recording method selection means, and to inhibit the recording action of said recording means on the output image signal from being performed by the frame recording method, if the period of the input image signal is not equal to said predetermined period and the frame recording method is selected.

10. A device according to claim 7, wherein said control means is arranged to control said recording means in accordance with the discrimination information signal outputted from said discrimination means and the selection information signal outputted from said recording method selection means, and to cause the recording action of said recording means on the output image signal to be performed by the field recording method, if the period of the input image signal is not equal to said predetermined period and the frame recording method is selected.

11. A device according to claim 7, wherein said control means is arranged operatively in accordance with the discrimination information signal outputted from said discrimination means, to cause said memory means to store only a part of the input image signal corresponding to said predetermined period if a period of a first field of the input image signal is not less than said predetermined period, to cause, if the period of the first field of the input image signal is less than said predetermined period, said memory means to complement the input image signal with a predetermined signal for a period by which the period of the first field of the input image signal is less than said predetermined period and store the complemented image signal, to cause said memory means to first store the predetermined signal for ½ H (H: 1 horizontal synchronizing period) and then store a second field of the input image signal until said predetermined period is reached if a period of the second field of the input image signal is not less than said predetermined period, and to cause, if said predetermined period is not reached by storing the second field of the input image signal, said memory means to complement the second field of the input image signal with the predetermined signal for a period by which the period of the second field of the input image signal is less than said predetermined period.

12. A device according to claim 7, wherein said control means is arranged operatively in accordance with the discrimination information signal outputted from said discrimination means, to cause said memory means to store only a part of the input image signal corresponding to said predetermined period, if a period of a first field of the input image signal is not less than said predetermined period, and if the period of the first field of the input image signal is less than said predetermined period, to cause said memory means to complement the input image signal with the predetermined signal for a period by which the period of the first field of the input image signal is less than said predetermined period and store the complemented image signal, to store next the predetermined signal for ½ H (H: 1 horizontal synchronizing period), and, after that, to form an interpolation image signal by using the first field of the input image signal already stored in said memory means and store the interpolation image signal until said predetermined period is reached.

13. An image signal processing device for processing image signals, comprising:
   a) memory means for storing an image signal;
   b) discrimination means arranged to receive an input image signal, to make a discrimination as to whether the input image signal is an interlaced image signal or a noninterlaced image signal and to output a discrimination information signal indicative of a result of the discrimination;
   c) recording method selection means arranged to select a recording method from among a field recording method for recording an image signal for one field in an image signal recording area for one field on a recording medium and a frame recording method for recording an image signal for one frame in an image signal recording area for two fields on the recording medium and to output a selection information signal indicative of the selected recording method;
   d) recording means for recording on the recording medium an output image signal outputted from said memory means; and
   e) control means for controlling a storing action of said memory means on the input image signal and a recording action of said recording means on the output image signal in accordance with the discrimination information signal outputted from said discrimination means and the selection information signal outputted from said recording method selection means.

14. A device according to claim 13, wherein said control means is arranged operatively in accordance with the discrimination information signal outputted from said discrimination means, to cause said memory means to store only a part of the input image signal corresponding to a predetermined period if the input image signal is the noninterlaced signal and a period of the input image signal is not less than said predetermined period, and if the period of the input image signal is less than said predetermined period, to cause said memory means to complement the input image signal with a predetermined signal for a period by which the period of the input image signal is less than said predetermined period and store the complemented image signal.

15. A device according to claim 13, wherein said control means is arranged to control said recording means in accordance with the discrimination information signal outputted from said discrimination means and the selection information signal outputted from said recording method selection means, and to inhibit the recording action of said recording means on the output image signal from being performed by the frame recording method, if the input image signal is the noninterlaced image signal, a period of the input image signal is not equal to a predetermined period and the frame recording method is selected.

16. A device according to claim 13, wherein said control means is arranged to control said recording means in accordance with the discrimination information signal outputted from said discrimination means and the selection information signal outputted from said recording method selection means, and to cause the recording action of said recording means on the output image signal to be performed by the field recording method, if the input image signal is the noninterlaced image signal, a period of the input image signal is not equal to a predetermined period and the frame recording method is selected.

17. A device according to claim 13, wherein said control means is arranged operatively in accordance with the discrimination information signal outputted from said discrimination means, to cause said memory means to store only a part of the input image signal corresponding to a predetermined period if the input image signal is the noninterlaced image signal and a period of a first field of the input image signal is not less than said predetermined period, to cause, if the period of the first field of the input image signal is less than said predetermined period, said memory means to complement the input image signal with a predetermined signal for a period by which the period of the first field of the input image signal is less than said predetermined period and store the complemented image signal to cause said memory means, to first store the predetermined signal for ½ H (H: 1 horizontal synchronizing period) and then store a second field of the input image signal until said predetermined period is reached if a period of the second field of the input image signal is not less than said predetermined period, and to cause, if said predetermined period is not reached by storing the second field of the input image signal, said memory means to complement the second field of the input image signal with the predetermined signal for a period by which the period of the second field of the input image signal is less than said predetermined period.

18. A device according to claim 13, wherein said control means is arranged operatively in accordance with the discrimination information signal outputted from said discrimination means, to cause said memory means to store only a part of the input image signal corresponding to a predetermined period if the input image signal is the noninterlaced image signal and a period of a first field of the input image signal is not less than said predetermined period, and if the period of the first field of the input image signal is less than said predetermined period, to cause said memory means to complement the input image signal with a predetermined signal for a period by which the period of the first field of the input image signal is less than said predetermined period and store the complemented image signal, to store next the predetermined signal for ½ H (H: 1 horizontal synchronizing period), and, after that, to form an interpolation image signal by using the first field of the input image signal already stored in said memory means and store the interpolation image signal until said predetermined period is reached.

* * * * *

UNITED STATES PATENT AND TRADEMARK OFFICE
CERTIFICATE OF CORRECTION

PATENT NO. : 5,379,073

DATED : January 3, 1995

INVENTOR(S) : Masato Kosugi et al.

It is certified that error appears in the above-identified patent and that said Letters Patent is hereby corrected as shown below:

Col. 3, line 34.  Change "filed" to -- field --.

Col. 6, line 9.  Change "circuit." to -- circuit --.

Col. 6, line 36.  Delete "of".

Col. 7, line 35.  Change "FIG.40" to -- FIG.4, --.

Col. 7, line 36.  Change "A" to -- a --.

Col. 8, line 22.  Change "To the" to -- The --.

Signed and Sealed this

Fourteenth Day of March, 1995

Attest:

BRUCE LEHMAN

*Attesting Officer*     *Commissioner of Patents and Trademarks*